United States Patent

Ohyoshi

[11] Patent Number: 6,008,845
[45] Date of Patent: Dec. 28, 1999

[54] COMPACT ELECTRONIC DIGITAL STILL CAMERA EQUIPPED WITH CONVERTER LENS

[75] Inventor: Masato Ohyoshi, Fussa, Japan

[73] Assignee: Casio Computer Co., Ltd., Tokyo, Japan

[21] Appl. No.: 08/798,247

[22] Filed: Feb. 11, 1997

[30] Foreign Application Priority Data

Feb. 15, 1996 [JP] Japan .................................. 8-050813

[51] Int. Cl.⁶ .................................................. H04N 9/07
[52] U.S. Cl. ........................... 348/360; 348/344; 396/74
[58] Field of Search .................................. 348/358, 335, 348/344, 360, 361, 369, 375; 359/372, 377; 396/351, 74

[56] References Cited

U.S. PATENT DOCUMENTS

| | | | |
|---|---|---|---|
| 2,901,943 | 9/1959 | Tackaberry | 359/372 |
| 4,058,827 | 11/1977 | Ando et al. | 348/332 |
| 4,072,970 | 2/1978 | Winkler | 396/348 |
| 4,529,283 | 7/1985 | Oshima et al. | 396/74 |
| 4,609,270 | 9/1986 | Kohno et al. | 396/74 |
| 4,772,903 | 9/1988 | Labaziewiez | 396/84 |
| 4,840,466 | 6/1989 | Yamada et al. | 359/672 |
| 5,479,203 | 12/1995 | Kawai et al. | 348/15 |
| 5,652,676 | 7/1997 | Grinblat | 359/363 |
| 5,708,857 | 1/1998 | Ishibashi | 396/21 |

Primary Examiner—Wendy Garber
Assistant Examiner—Andrew D. Martin
Attorney, Agent, or Firm—Frishauf, Holtz, Goodman, Langer & Chick, P.C.

[57] ABSTRACT

An electronic digital still camera apparatus has a converter lens which is used in a wide angle imaging mode and which is rotatably moved so as to achieve a compact camera apparatus. The electronic digital still camera apparatus has a master lens for focusing an image of a photographing object onto an imaging plane thereof; a converter lens rotatably moved between a position on an optical path defined from the photographing object to the master lens, and another position outside the optical path defined from the photographing object to the master lens; and a reflection mirror arranged at a position substantially equal to a rotation center of the converter lens, for reflecting light derived from the photographing object toward the master lens.

28 Claims, 10 Drawing Sheets

COMPACT ELECTRONIC DIGITAL STILL CAMERA EQUIPPED WITH CONVERTER LENS

BACKGROUND OF THE INVENTION

1. Field of the Invention

The present invention generally relates to an electronic imaging apparatus. More specifically, the present invention is directed to a compact electronic digital still camera apparatus equipped with a converter lens.

2. Description of the Prior Art

Conventionally, there are two-focal-point switching type electronic digital still camera apparatuses equipped with master lenses for the telescopic imaging mode and converter lenses for the wide angle imaging mode.

This sort of electronic digital still camera apparatus has the following camera structure. That is, the wide-angle imaging converter lens is switchably arranged in front of (namely, light incident side) the telescopic imaging master lens for focusing an image of a photographing object onto an imaging plane thereof. When this electronic digital still camera apparatus is operated in the telescopic imaging mode, the converter lens for the wide angle imaging mode is moved out from the optical path during photographing operation. When this electronic digital still camera apparatus is operated in the wide angle imaging mode, the converter lens is inserted onto the optical path during a photographing operation.

As this converter lens switching method, there are various switching methods. For example, the converter lens is moved along a direction perpendicular to the optical axis, and the converter lens is rotated around a point intersected with the optical axis at a right angle as a rotation center so as to be moved.

However, the above-described conventional converter lens switching systems have the following problems. In the first-mentioned converter lens switching system, since the converter lens is moved along the direction perpendicular to the optical axis, a space for storing this converter lens must be provided along the direction perpendicular to the optical axis in order to move the converter lens. As a result, the entire camera apparatus would become bulky.

On the other hand, in the last-mentioned converter lens switching system, since the converter lens is rotatably moved around the point intersected with respect to the optical axis at a right angle as the rotation center, the imaging plane, the master lens, and the converter lens must be arranged along a straight line on the optical path, although the space for storing the converter lens can be reduced. This is because this optical path defined from the photographing object to the imaging plane constitutes a straight line. The dimension of the entire electronic camera apparatus is restricted by the length of this optical path defined from the imaging plane to the converter lens. When the sufficiently long optical path length is secured, the entire electronic camera apparatus would become elongated.

SUMMARY OF THE INVENTION

The present invention has been made to solve the above-described problems, and therefore, has an object to provide an electronic digital still camera apparatus capable of being made in a compact size, while maintaining a sufficient length of an optical path defined from a lens to an imaging unit, even mounting a converter lens.

To achieve the object, according to an aspect of the present invention, an electronic camera apparatus capable of switching photographing ranges comprises:

a master lens for focusing an image of a photographing object onto an imaging plane thereof;

a converter unit which includes a converter lens rotatably moved between a position on an optical path defined from the photographing object to the master lens, and another position outside the optical path defined from the photographing object to the master lens; and a reflection section arranged at a position substantially equal to a rotation center of the converter unit, for reflecting light derived from the photographing object toward the master lens.

Also, according to another aspect of the present invention, an electronic camera apparatus capable of switching photographing ranges comprises:

a master lens for focusing an image of a photographing object onto an imaging plane thereof;

a converter unit which includes a mirror and a converter lens, and wherein the converter unit is rotatably movable; and wherein the mirror is arranged at a position substantially equal to a rotation center of the converter unit, and reflects light derived from the photographing object toward the master lens.

Further, according to another aspect of the present invention, an electronic camera apparatus capable of switching photographing ranges comprises:

a master lens for focusing an image of a photographing object onto an imaging plane thereof;

a converter lens rotatably moved between a position on an optical path defined from the photographing object to the master lens, and another position outside the optical path defined from the photographing object to the master lens; and a reflection mirror arranged at a position substantially equal to a rotation center of the converter lens, for reflecting light derived from the photographing object toward the master lens.

Moreover, according to another aspect of the present invention, an electronic camera apparatus capable of switching photographing ranges comprises:

a master lens for focusing an image of a photographing object onto an imaging plane thereof;

reflection section positioned on an optical path defined from the photographing object to the master lens, for reflecting light derived from the photographing object toward the master lens;

a CCD (charge-coupled device) positioned at the imaging plane of the master lens, for imaging an image of the photographing object, which has been reflected by the reflection section to be reversed with respect to right/left directions, to produce image data; and a image inverting section for inverting the image data with respect to the right/left directions to produce an originally positioned image of the photographing object with respect to the right/left directions.

BRIEF DESCRIPTION OF THE DRAWINGS

A more complete understanding of the teachings of the present invention may by acquired by referring to the accompanying figures, in which like reference numbers indicate like features and wherein.

DETAILED DESCRIPTION OF THE PREFERRED EMBODIMENTS

OUTER VIEW OF FIRST ELECTRONIC DIGITAL STILL CAMERA APPARATUS

Referring now to FIG. 1 to FIG. 11, an electronic digital still camera apparatus according to a first preferred embodiment of the present invention will be described.

FIG. 1 to FIG. 6 are outer views for showing a first electronic digital still camera apparatus equipped with a liquid crystal panel.

The first electronic digital still camera apparatus 1 is arranged by two blocks: a main unit 1 and a camera unit 3.

The main unit 2 is provided with a liquid crystal display panel (LCD panel) 5, and a function key 6 which are mounted in a rear surface of a main casing 4 of the main unit 6.

Figure 1:
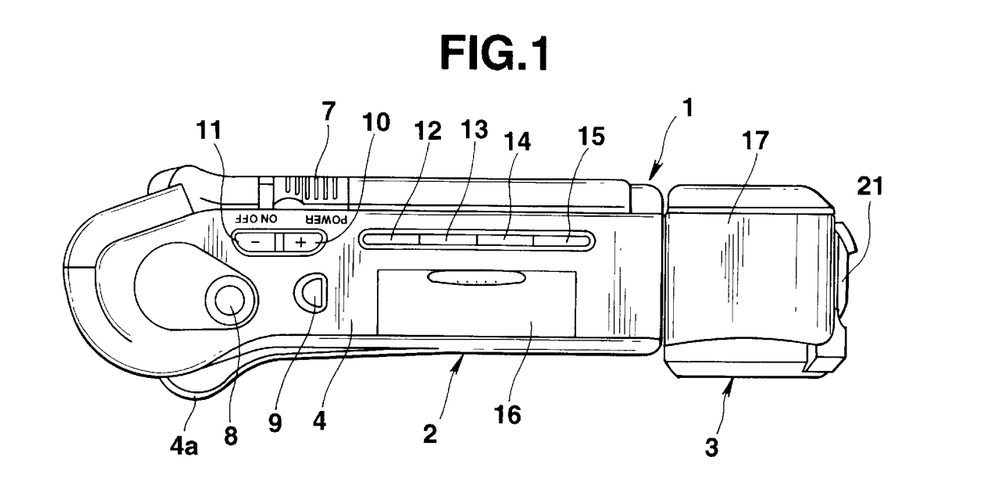
FIG. 1 is a plan view for showing an outer appearance of an electronic digital still camera apparatus according to a first embodiment of the present invention.
Figure 2:
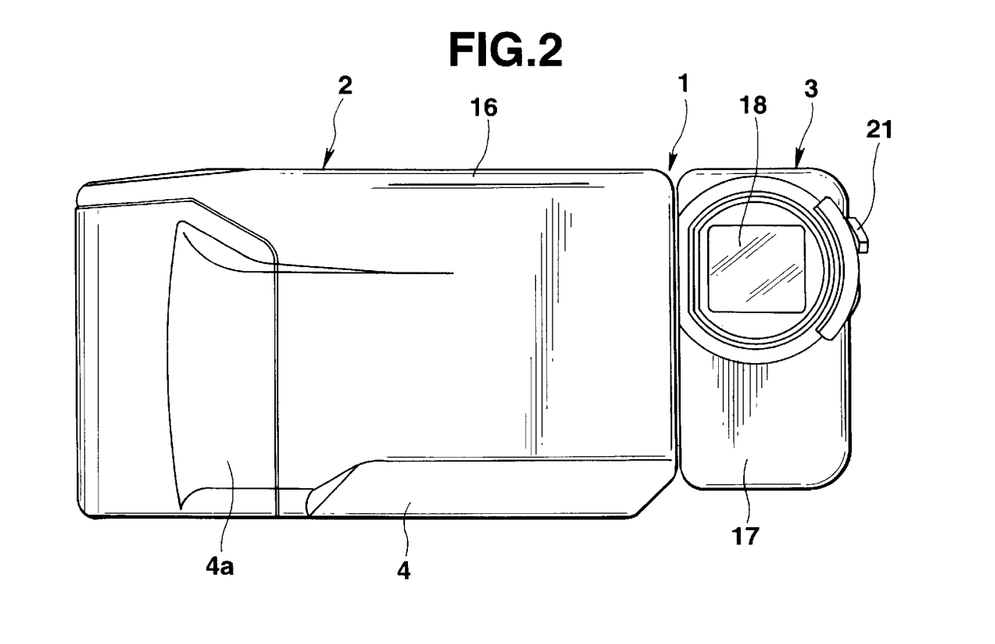
FIG. 2 is a front view for showing the electronic still camera of FIG. 1.

The main casing 4 of the main unit 2 is provided with a power switch 7, a shutter button 8, a delete key 9, a plus key 10, a minus key 11, a mode key 12, a display key 13, a zoom key 14, and a self timer key 15, all of which are mounted on an upper surface of the casing 4 of the main unit 2 (see FIG. 1). The main unit 2 of the electronic digital still camera 1 is further provided with a lid 16. An external power terminal, a video signal input/output terminal and a digital terminal (not shown) are provided inside the lid 16. The casing 4 of the main unit 2 forms a somewhat fat-shaped grip portion 4a for an easy right-hand operation by a user, as shown in FIG. 1 and FIG. 2. This grip portion 4a owns a structure capable of storing thereinto a plurality of dry cells (not shown in detail).

Figure 3:
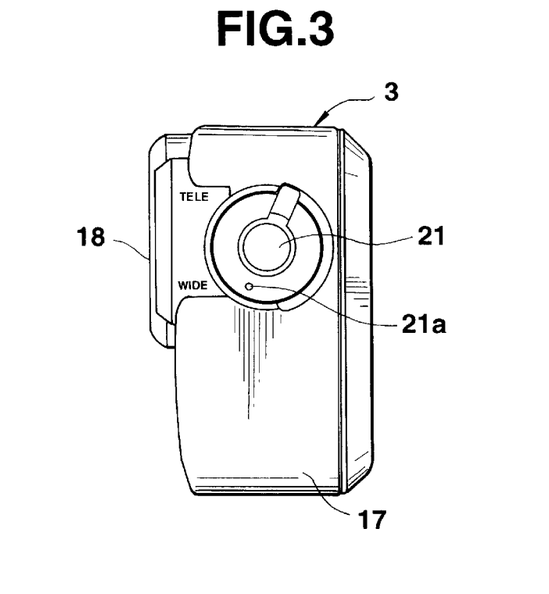
FIG. 3 is a right side view for representing the electronic still camera of FIG. 1.
Figure 4:
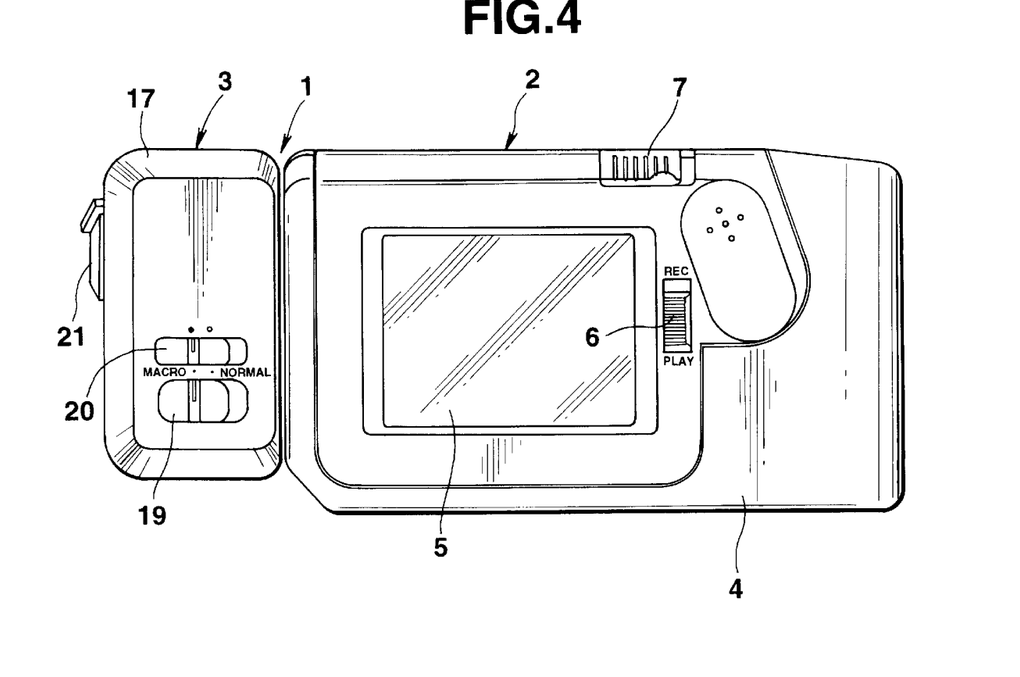
FIG. 4 is a rear view for indicating the electronic still camera of FIG. 1.

The camera unit 3 is provided with a camera case 17. As shown in FIG. 2, a photographing (imaging) opening unit 18. Also, shown in FIG. 4, a focusing switch 19 and a diaphragm changing switch 20 are provided on a rear surface of this camera case 17. As indicated in FIG. 3, a switching lever 21 for switching a telescopic imaging mode (TELE) and a wide angle imaging mode (WIDE) is rotatably mounted on a side surface of the camera case 17.

Figure 5:
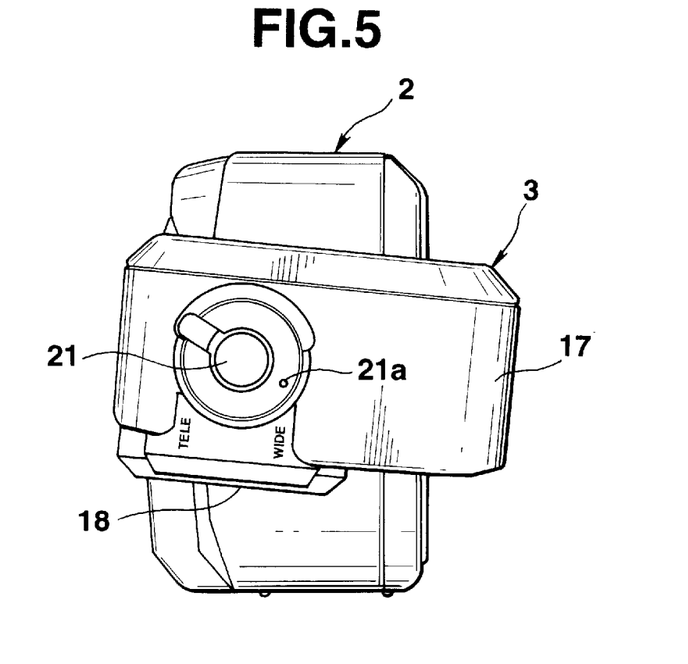
FIG. 5 is a side view for showing such a condition that the camera unit is rotated by 90 degrees in the forward direction with respect to the main unit in FIG. 3.
Figure 6:
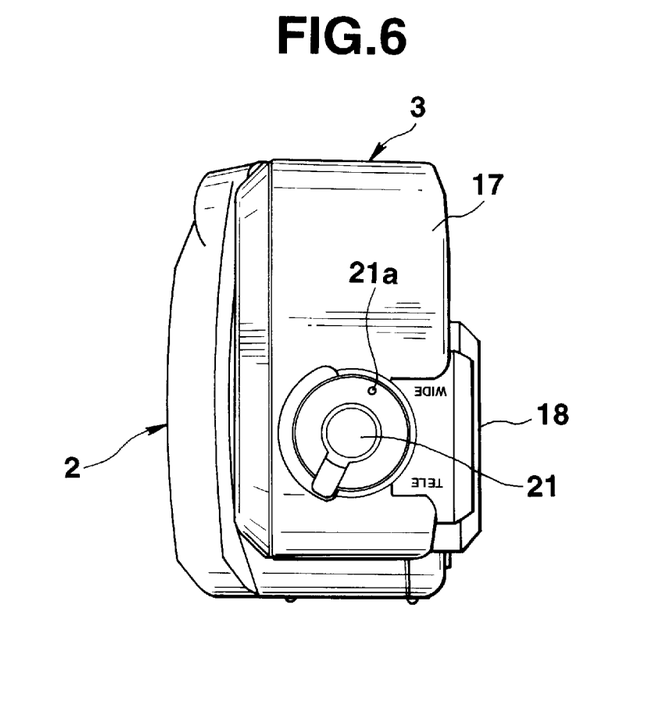
FIG. 6 is a side view for showing such a condition that the camera unit is rotated by 180 degrees in the backward direction with respect to the main unit in FIG. 3.

In FIG. 1 and FIG. 2, this camera unit 3 is rotatably mounted on a right side surface of the main body unit 2. In other words, as illustrated in FIG. 5, the camera unit 3 is rotatably mounted on the main unit 2 in such a manner that the camera unit 3 is rotated in the forward direction by 90 degrees with respect to the main unit 2, and thus the photographing opening unit 18 is directed just to the lower direction. Also, as illustrated in FIG. 6, the camera unit 3 is rotatably mounted on the main body 2 in such a manner that this camera unit 3 is rotated by 180 degrees along the backward direction with respect to the main unit 2, and therefore the imaging opening unit 18 is directed to a photographer.

INTERNAL STRUCTURE OF FIRST ELECTRONIC DIGITAL STILL CAMERA APPARATUS

Figure 7:
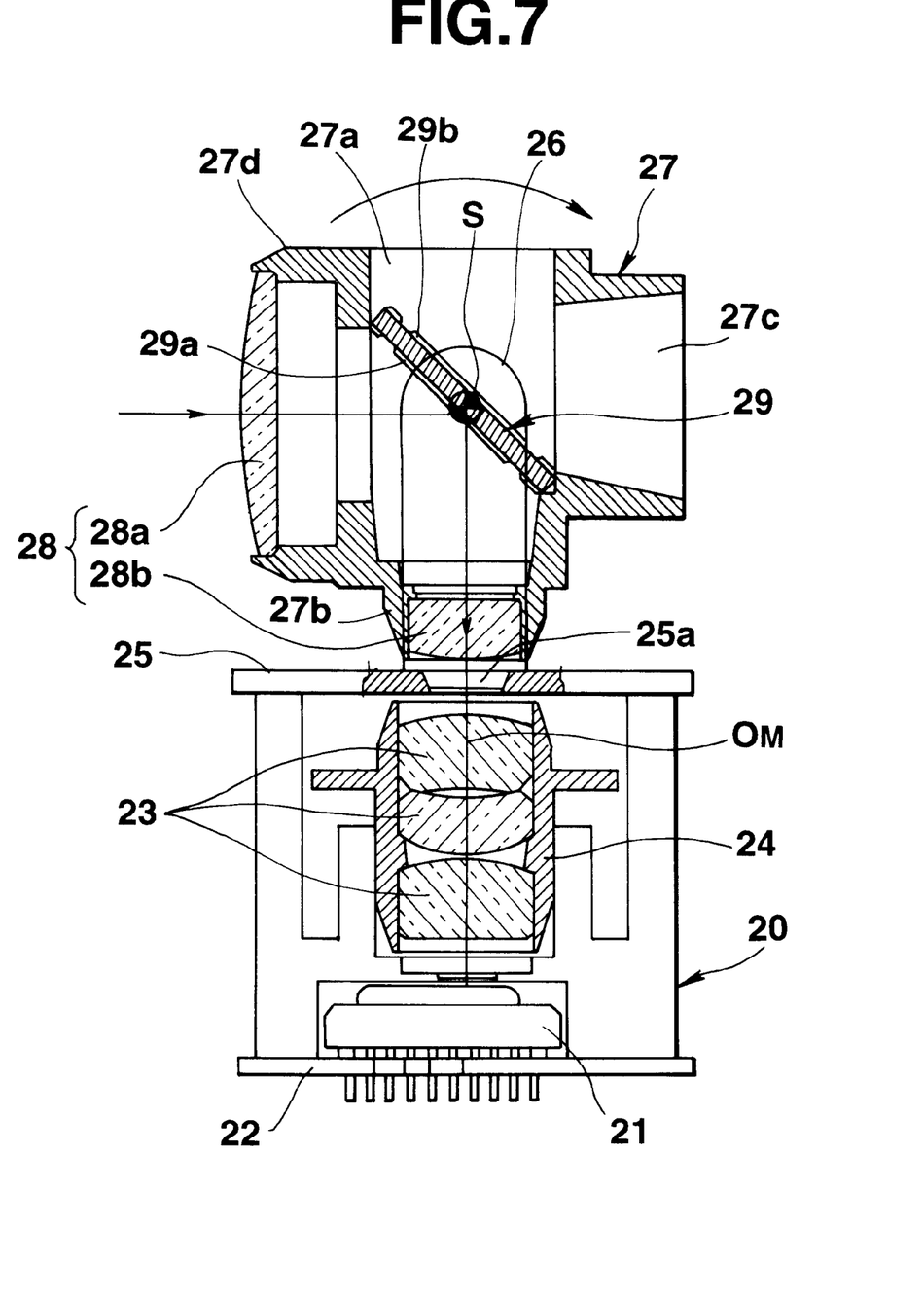
FIG. 7 is a sectional view for indicating an internal condition of the camera unit of the electronic still camera shown in FIG. 1 operated under wide angle imaging mode.
Figure 8:
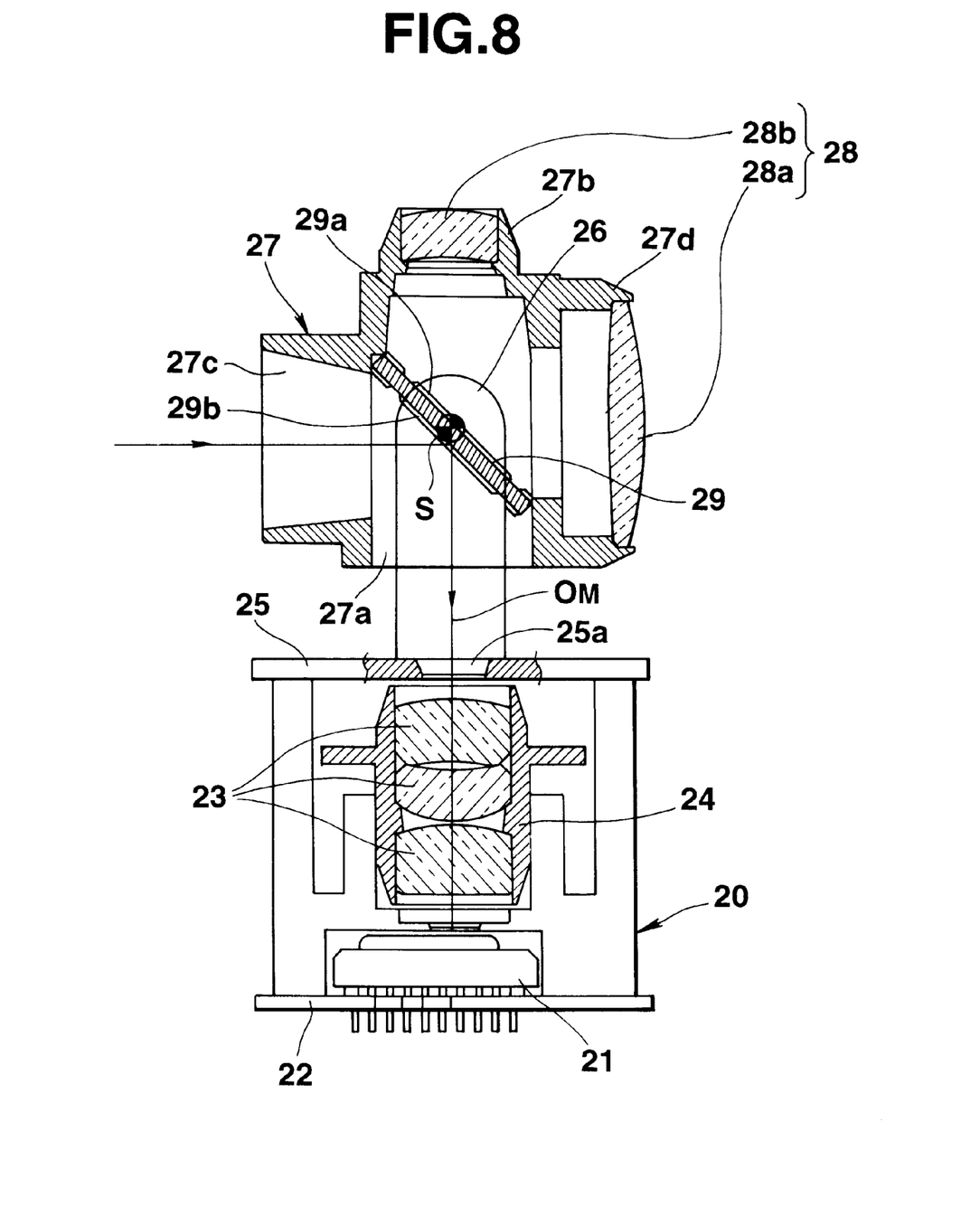
FIG. 8 is a sectional view for indicating an internal condition of the camera unit of the electronic still camera shown in FIG. 1 operated under telescopic imaging mode.

An internal structure of the camera unit 3 is illustrated in FIG. 7 and FIG. 8. That is, a holder 20 is provided inside the camera case 17. A solid-state imaging element 21 such as a CCD (change-coupled device) is mounted via a circuit board 22 in a lower portion of this holder 20. A master lens 23 is mounted via a mounting cylinder 24 inside the holder 20. The master lens 23 corresponds to a telescopic lens system constituted by three lenses, and owns an optical structure capable of focusing an image of a photographic object onto an imaging surface of the solid-state imaging element 21. Furthermore, a mounting base 25 is provided at an upper portion of the holder 20. A light transmission hole 25a is provided in correspondence with the master lens 23 in this mounting base 25, and one pair of supporting arms 26 are formed on the portions along the front/rear direction (as viewed in the drawing, along front/rear direction of this drawing plane) with sandwiching this light transmission hole 25a.

LENS HOLDING CONVERTER UNIT 27

A converter unit 27 for holding the lens (will be simply referred to as a "converter unit" 27 hereinafter) is rotatably mounted between one pair of the supporting arms 26.

The converter unit 27 is formed in such a manner that light conducting holes are formed inside this converter unit 27 with being intersected with each other in a cross shape. A predetermined portion of an outer surface of this converter unit 27, which corresponds to a center "S" of the intersecting portion of the light conducting holes, is rotatably supported by one pair of supporting arms 26 within a range of 180 degrees. In other words, the converter unit 27 owns such a structure. That is, under condition that the center "S" of the intersecting portion of the light conducting holes is positioned on an optical axis "$O_M$" of the master lens 23, a center line of one light conducting hole is made coincide with the optical axis "$O_M$" of the master lens 23, and a center line of the other light conducting hole is positioned perpendicular to the optical axis "$O_M$" at the center S of the intersecting portion. In this case, one light conducting hole coincident with the optical axis $O_M$ of the master lens 23 is formed with a light projection port 27a and a lens mounting portion 27b on upper and lower ends thereof. When the converter unit 27 is rotated by 180 degrees, both the light projection port 27a and the lens mounting portion 27b approach the master lens 23. Also, the other light conducting hole positioned perpendicular to the optical axis $O_M$ of the master lens 23 is formed with a light projection port 27c and a lens mounting portion 27d on right and left ends thereof. When the converter unit 27 is rotated by 180 degrees, both the light projection port 27c and the lens mounting portion 27d approach the photographing opening unit 18.

Then, a converter lens 28 and a reflection mirror 29 are mounted on this converter unit 27. The converter lens 28 is a wide angle lens system constructed of two lenses, i.e., a light-incident-sided lens 28a and a light-projection-sided lens 28b. The light-incident-sided lens 28a is mounted on the light-incident-sided lens mounting portion 27d of the converter unit 27, and the light-projection-sided lens 28b is mounted on the light-projection-sided lens mounting portion 27b of this converter unit 27. As a consequence, the respective lenses 28a and 28b are arranged under such a condition that these lenses are intersected with each other at a right angle. In response to the rotations of the converter unit 27, the respective lenses 28a and 28b are rotatably moved from a position on the optical path to another position outside the optical path defined from the photographing object to the master lens 23, and also are switched. The reflection mirror 29 is a reflection mirror having both reflection surfaces 29a and 29b provided on both surfaces thereof. This reflection mirror 29 is positioned under such a condition that this reflection mirror 29 is inclined by 45 degrees with respect to the optical axis $O_M$ of the master lens 23 with respect to a rotation center of the converter unit 27. A peripheral portion of this reflection mirror 29 is mounted within the converter unit 27, and this reflection mirror 29 is rotated by 180 degrees in an integral manner with this converter unit 27.

Figure 9:
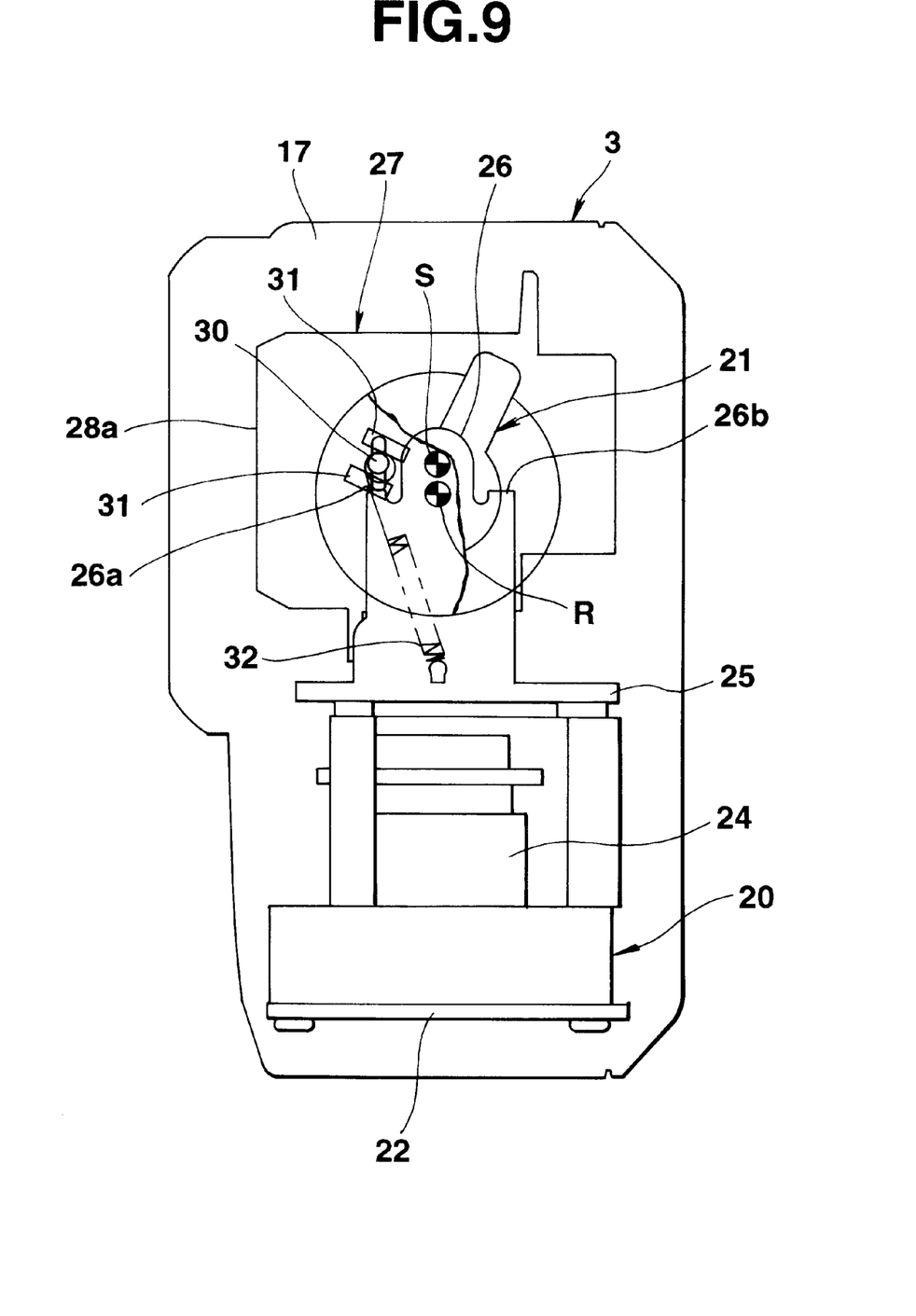
FIG. 9 schematically represents a mechanical relationship between the change lever and the lens holding member (converter unit holding a lens) in the electronic still camera shown in FIG. 7 operated under wide angle imaging mode.
Figure 10:
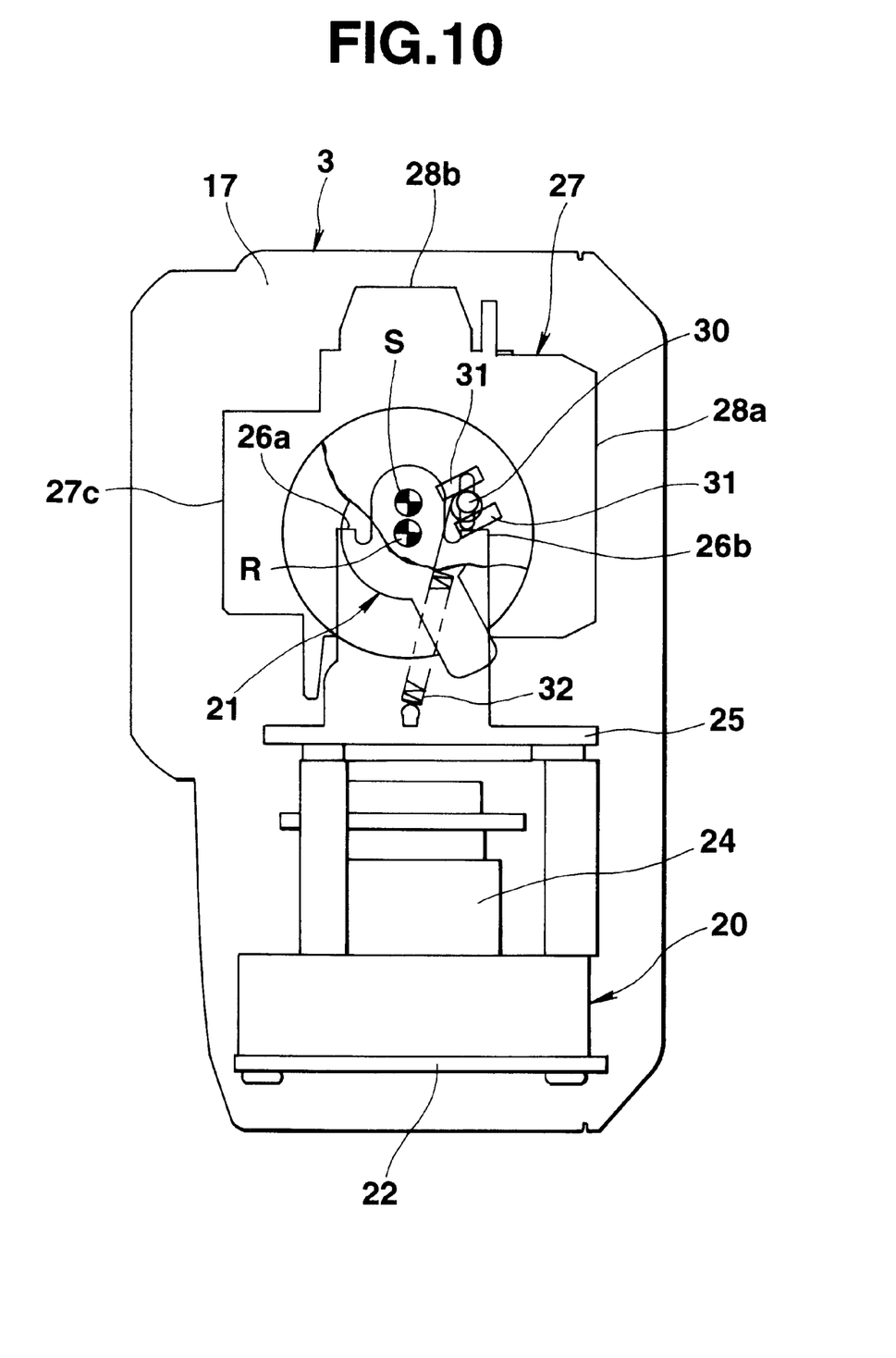
FIG. 10 schematically represents a mechanical relationship between the change lever and the lens holding member (converter unit holding a lens) in the electronic still camera shown in FIG. 8 operated under telescopic imaging mode.

As represented in FIG. 9 and FIG. 10, the converter unit 27 has such a structure that this converter unit 27 is rotated in conjunction with the pivot operation of the switching lever 27 provided on a side surface of the camera case 17. In other words, this converter unit 27 has such a rotation structure that a pin 30 is provided on the outer surface thereof, and a tip portion of this pin 30 is positioned under such a condition that this tip portion is sandwiched between one pair of parallel ribs 31 provided on the inner surface of the switching lever 21. In response to the rotational movement of the parallel ribs 31 caused by the rotations of the switching level 21, the pin 30 is rotatably moved around the rotation center S of the converter unit 27. In this case, the rotation center "S" of the converter unit 27 may be made coincident with a rotation center "R" of the switch lever 21. Alternatively, as shown in FIG. 9 and FIG. 10, the rotation center "S" of the converter unit 27 may be positionally shifted with respect to the rotation center "R" of the switching lever 21. In this case, in response to the rotary movement of the parallel ribs 31, the pin 30 is transported between the parallel ribs 31. When the pin 30 is rotatably moved by 180 degrees around the rotation center S of the converter unit 27, this pin 30 is positionally restricted in such a way that this pin 30 abuts against position restricting portions 26a and 26b formed on the upper portion of the supporting arm of the mounting base 27. Furthermore, the pin 30 is energized in such a manner that this pin 30 may abut against any one of the position restricting portions 26a and 26b by a coil spring 32 tensioned between this pin 30 and the supporting arm 26.

CIRCUIT ARRANGEMENT OF FIRST ELECTRONIC DIGITAL STILL CAMERA APPARATUS

Figure 11:
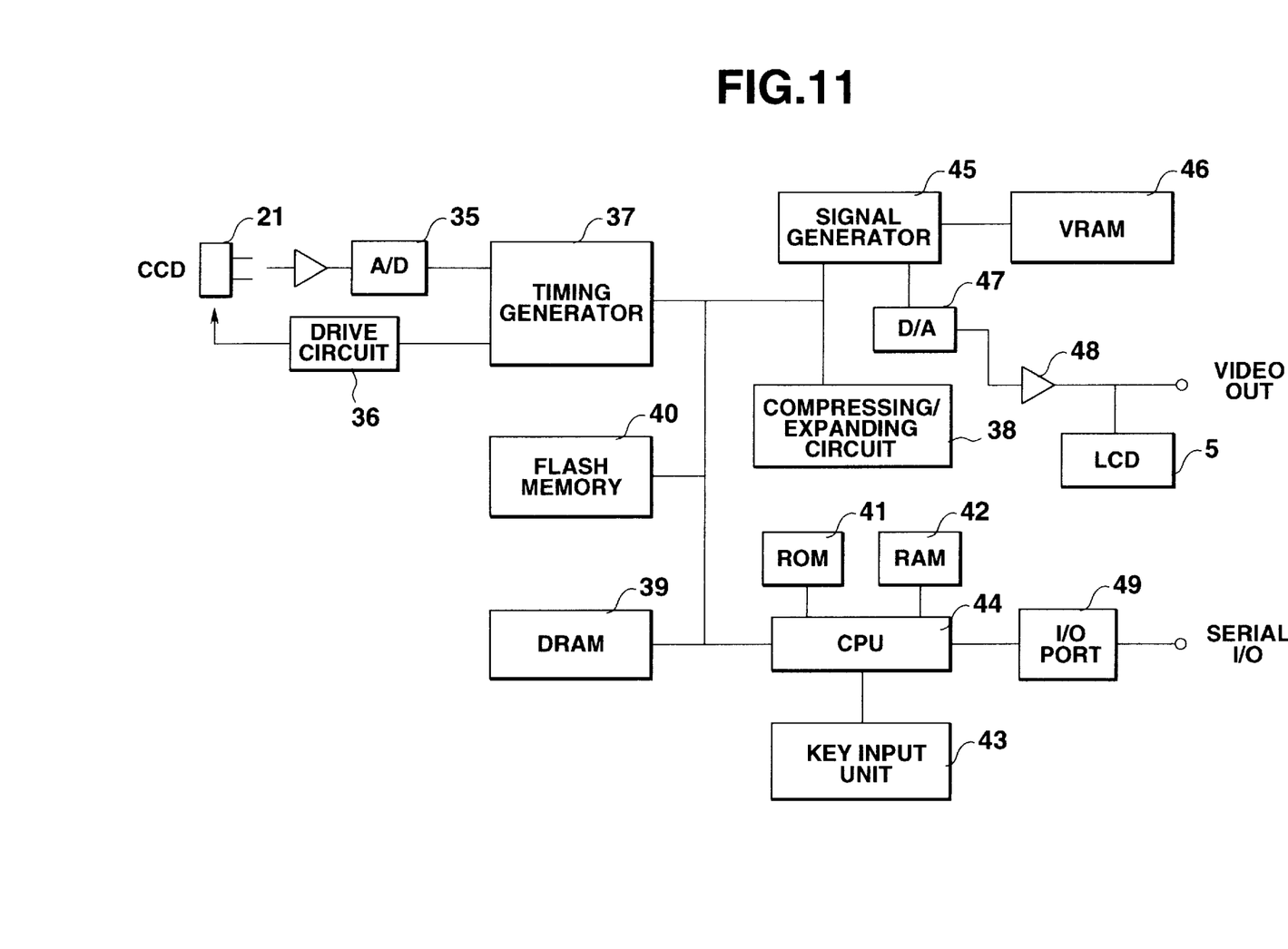
FIG. 11 is a schematic block diagram for indicating a circuit arrangement of the electronic still camera shown in FIG. 1.

The above-described first electronic digital still camera apparatus 1 is electrically arranged by such a circuit arrangement as shown in FIG. 11. The circuit arrangement of this first electronic digital still camera apparatus is constructed of a solid-state imaging element 21 such as a CCD for converting an image of a photographing object focused on an imaging plane thereof into an electric image signal; an A/D converter 35 for converting an analog image signal derived from this solid-state imaging element 21 into a digital image signal; a drive circuit 36 for driving the solid-state imaging element 21; and a timing generator 37 for generating a timing signal used to control this drive circuit 36. This circuit arrangement is further constructed by a compressing/expanding circuit 38 for compressing/expanding the digital image signal by the coding/decoding manner; a DRAM (dynamic RAM) 39 for temporarily storing the acquired digital image signal; a flash memory 40 for storing the compressed image signal; a CPU (central processing unit) 44 operable based on a program stored in the ROM 41, for using the RAM 41 as a work RAM, and operable in response to an input from a key input unit 43; and a signal generator 45 for generating a digital video signal by adding a synchronization signal to the digital image signal. This circuit arrangement further includes a VRAM 46 for recording the digital video signal; a D/A converter 47 for converting the digital video signal outputted from the signal generator 45 into an analog video signal; a liquid crystal display panel 5 for displaying an image in response to the analog video signal inputted via an amplifier 48; and also an interface 49 for outputting such an image signal which has been converted into a serial signal by the CPU 44.

In the electronic digital still camera apparatus 1 with employment of the above-described circuit arrangement, the timing signal 13 outputted from the timing generator 37 in a preselected time period so as to control the drive circuit 36. Accordingly, the image signal corresponding to the image of the photographing object focused on the imaging plane of the solid-state imaging element 21 is acquired. Then, the acquired analog image signal is converted into the digital image signal by the A/D converter 35, which is temporarily stored in the DRAM 39. In this case, since the digital image signal derived from the solid-state imaging element 21 and temporarily stored in the DRAM 39 constitutes such an image that the image of the photographing object is reversed by the reflection mirror 29 with respect to the right/left directions, the digital image signals are sequentially written into the DRAM 39 under the above-explained reversed image condition with respect to the right/left directions. When the digital image signal stored in the DRAM 39 is read under control of the CPU 44, this digital image signal is read in accordance with such a sequential operation which is different from the data writing sequential operation. As a consequence, the digital image signal which has been written into the DRAM 39 under the above-explained image condition reversed along the right/left direction is read as a digital image signal of an image correctly directed along the right/left direction. The synchronization signal is added to this read digital image signal in the signal generator 45 to thereby produce the digital video signal. Then, this digital video signal is converted into the analog video signal by the D/A converter 47. Thereafter, this analog video signal is amplified by the amplifier 48 to obtain an analog video signal. In response to this analog video signal, the liquid crystal display panel 5 is driven. As a consequence, the image is displayed on the liquid crystal display panel 5 along the correct right/left direction of the image of the photographing object.

WIDE ANGLE IMAGING OPERATION OF FIRST ELECTRONIC DIGITAL STILL CAMERA APPARATUS

A description will now be made of various operations of the above-described first electronic digital still camera apparatus 1 shown in FIG. 1 to FIG. 11.

In the case that the photographing object is photographed by the wide angle lens system of the first electronic digital still camera apparatus 1, as shown in FIG. 3, the switching lever 21 is pivotally operated to position a positioning mark 21a to the wide angle position (position "WIDE"). Thus, the converter unit 27 is rotated, so that the light-projection-sided lens 28b of the converter lens 28 employed in the wide angle lens system is arranged close to the master lens 23, the light-incident-sided lens 28a is arranged close to the photographing opening unit 18 of the camera case 17, and also the reflection plane 29a of the reflection mirror 29 is inclined by 45 degrees with respect to the optical axis $O_M$ of the master lens 23. As a result, when the light-incident-sided lens 28a is directed to the photographing object, the wide angle photographing operation by the first electronic digital still camera apparatus 1 can be prepared.

Under this wide angle photographing operation, the light derived from the photographing object is entered from the photographing opening unit 18 into the light-incident-sided lens 28a of the converter lens 28, and then is reflected from the reflection plane 29a of the reflection mirror 29. This reflection light is entered via the light-projection-sided lens 28b into the master lens 23, so that this incident light is focused onto the imaging surface of the solid-state imaging element 21 as the wide angle image of the photographing object. At this focusing operation, the image of the photographing object is focused by the reflection mirror 29 as the image reversed with respect to the right/left direction. This focused image is converted into the electric image signal by the solid-state imaging element 21, and then this electric image signal is temporarily stored in the DRAM 39 as the digital image signal. Since the stored digital image signal is read in accordance with the sequential operation different from that for the writing operation under control of the CPU 44, the wide angle image of the photographing object is displayed on the liquid crystal display panel 5 as the image correctly directed along the right/left direction. As a consequence, while observing the image of the photographing object displayed on the liquid crystal display panel 5, this photographing object can be photographed by the first electronic digital still camera apparatus in the wide angle mode.

TELESCOPIC IMAGING OPERATION OF FIRST ELECTRONIC DIGITAL STILL CAMERA APPARATUS

In the case that the photographing object is photographed by the telescopic lens system of the first electronic digital still camera apparatus 1, as shown in FIG. 3, the switching lever 21 is pivotally operated to position the positioning mark 21a to the telescopic imaging position (position "TELE"). Thus, as indicated in FIG. 10, both the converter unit 27 and the reflection mirror 29 are rotated by 180 degrees, the respective lenses 28a and 28b of the converter lens 28 are rotatably moved out from the optical path defined from the photographing object to the master lens 23. Also, the light-projection-port 27a of the converter unit 27 is located close to the master lens 23, the light-incident-port 27c of the converter unit 27 is positioned close to the photographing opening unit 18 of the camera case 17, and also the reflection plane 29a of the reflection mirror 29 is inclined by 45 degrees with respect to the optical axis $O_M$ of the master lens 23. As a result, when the light-incident-sided lens 28a is directed to the photographing object, the telescopic photographing operation by the first electronic digital still camera apparatus 1 can be prepared.

Under this telescopic photographing operation, the light derived from the photographing object is entered through the photographing opening unit 18 into the light incident port 24c of the converter port 27, and then is reflected from the reflection plane 29b of the reflection mirror 29. This reflection light is entered via the light projection port 27a into the master lens 23 corresponding to the telescopic lens system, so that this incident light is focused onto the imaging surface of the solid-state imaging element 21 as the telescopic image of the photographing object. Also, at this focusing operation, the image of the photographing object is focused by the reflection mirror 29 as the image reversed with respect to the right/left direction. Similar to the wide angle photographing operation, this focused image is converted into the electric image signal by the solid-state imaging element 21, and then this electric image signal is temporarily stored in the DRAM 39 as the digital image signal. Since the stored digital image signal is read in accordance with the sequential operation different from that for the writing operation under control of the CPU 44, the telescopic image of the photographing object is displayed on the liquid crystal display panel 5 as the image correctly directed along the right/left direction. As a consequence, while observing the image of the photographing object displayed on the liquid crystal display panel 5, this photographing object can be photographed by the first electronic digital still camera apparatus in the telescopic imaging mode.

It should be noted that as shown in FIG. 5, when the camera unit 3 is rotated by 90 degrees along the forward direction with respect to the main unit 2 in any of the wide angle photographing mode and the telescopic photographing mode, the image of the photographing object located just under the camera apparatus 1 can be photographed. Similarly, when the camera unit 3 is rotated by 180 degrees along the backward direction (see FIG. 6), the image of the photographing object on the side of the photographer, namely the photographer himself can be photographed. At this time, the photographed image becomes such an image reversed with respect to the upper/lower direction. When the camera unit 3 is rotated by 180 degrees, a switch (not shown) is turned ON so as to electrically invert the image signal about the photographed image reversed with respect to the upper/lower direction, so that the correctly standing image is displayed on the liquid crystal display panel 5.

As described above, in this electronic digital still camera apparatus 1, the converter lens 28 used for the wide angle photographing operation is positioned on the light-incident-side of the master lens 23 used for the telescopic photographing operation, which focuses the image of the photographing object onto the imaging surface of the solid-state imaging element 21, in such a manner that this converter lens 28 can be rotatably moved. Then, this converter lens 28 is rotatably moved to the position on the optical path defined from the photographing object to the master lens 23, and also to the position out of this optical path, and further the reflection mirror 29 is so arranged at the position corresponding to the rotation center S of the converter lens 28, which may reflect the light derived from the photographing object toward the master lens 23. As a result, the optical path defined from the photographing object to the imaging surface of the solid-state imaging element 21 can be bent by this reflection mirror 29, so that the entire length of the camera unit 3 can be set by the short optical path length defined from the imaging surface to the reflection mirror 29 without changing the optical path length defined from the imaging surface to the light-incident-sided lens 28a of the converter lens 28. The entire dimension of the camera unit 3 is not restricted by the optical path length defined from the imaging surface to the converter lens 8, but also the entire camera unit 3 can be made compact. Moreover, the camera unit 3 can be mounted in high density.

Also, in accordance with the first electronic digital still camera apparatus 1, the image of the photographing object is focused by the reflection mirror 29 as the image reversed with respect to the right/left direction. This focused image is converted into the electric image signal by the solid-state imaging element 21, and then this electric image signal is temporarily stored in the DRAM 39 as the digital image signal. Since the stored digital image signal is read in accordance with the sequential operation different from that for the writing operation under control of the CPU 44, this read digital image signal can be handled as the image signal about the same image of the photographing object correctly directed along the right/left direction. As a consequence, while observing the image of the photographing object displayed on the liquid crystal display panel 5, this photographing object can be photographed by the first electronic digital still camera apparatus under better conditions.

It should also be noted that although the reflection mirror 29 is equipped with the mirror planes 29a and 29b as the separate member, these mirror planes 29a and 29b may be alternatively formed by utilizing front/rear planes of a single reflection mirror, for instance, a metal is vapor-deposited on one plane of a transparent glass, and thus both this metal-vapored plane and the glass plane are used as mirror planes.

STRUCTURE OF SECOND ELECTRONIC DIGITAL STILL CAMERA APPARATUS

Next, an electronic digital still camera apparatus, according to a second embodiment of the present invention, will now be described with reference to FIG. 12 and FIG. 13. It should be understood that the same reference numerals shown in FIG. 1 to FIG. 11 of the first embodiment will be employed as those for denoting the same, or similar elements of the second embodiment.

Figure 12:
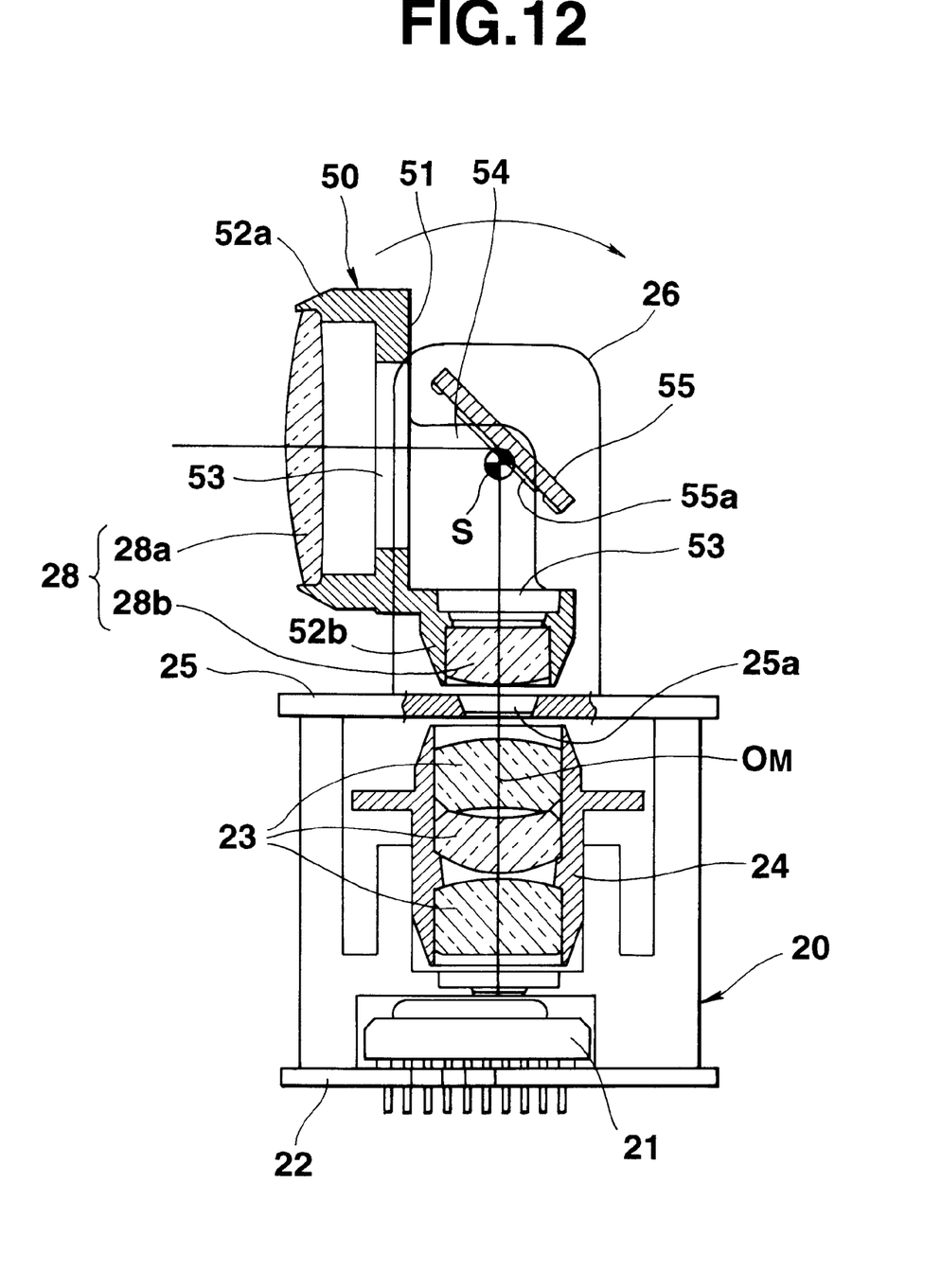
FIG. 12 is a sectional view for representing an internal condition of a camera unit of an electronic digital still camera apparatus operated under wide angle imaging mode, according to a second embodiment of the present invention.
Figure 13:
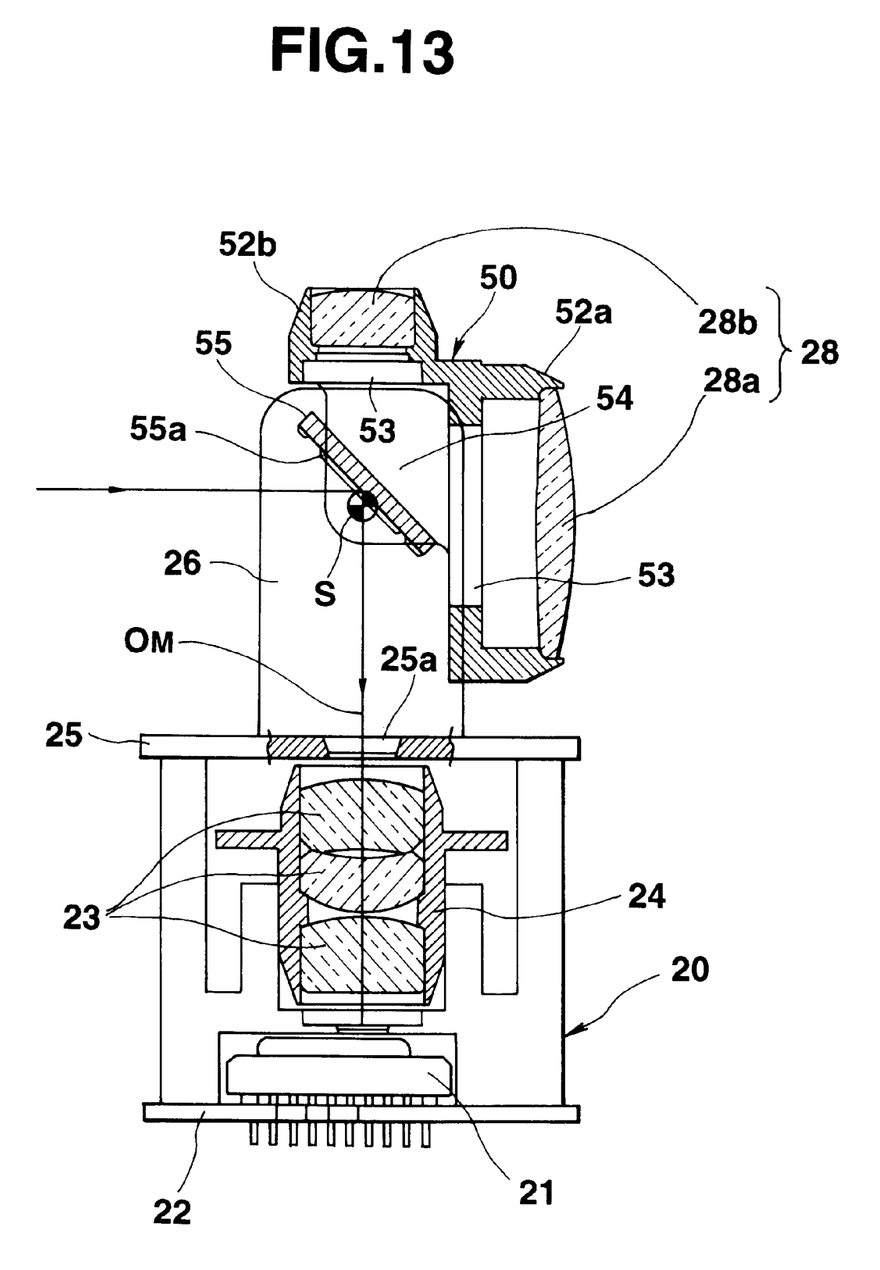
FIG. 13 is a sectional view for representing an internal condition of a camera unit of an electronic still camera operated under telescopic imaging mode, according to the second embodiment of the present invention.

A camera unit 3 of this second electronic digital still camera apparatus 1 owns such a structure as shown in FIG. 12 and FIG. 13. That is, similar to the first embodiment, a holder 20 is provided inside the camera case 17. A solid-state imaging element 21 such as a CCD (change-coupled device) is mounted via a circuit board 22 in a lower portion of this holder 20. A master lens 23 is mounted via a mounting cylinder 24 inside the holder 20. The master lens 23 corresponds to a telescopic lens system constituted by three lenses, and owns an optical structure capable of focusing an image of a photographic object onto an imaging surface of the solid-state imaging element 21. Furthermore, a mounting base 25 is provided at an upper portion of the holder 20. A light transmission hole 25a is provided in correspondence with the master lens 23 in this mounting base 25, and one pair of supporting arms 26 are formed on the portions along the front/rear direction (as viewed in the drawing, along front/rear direction of this drawing plane) with sandwiching this light transmission hole 25a.

STRUCTURE OF CONVERTER UNIT IN SECOND ELECTRONIC DIGITAL STILL CAMERA APPARATUS

A converter unit 50 for holding the lens (will be simply referred to as a "converter unit" hereinafter) owns the following structure. That is, cylindrical lens mounting portions 52a and 52b are provided on respective outer surfaces of an L-shaped main body member 51, and light transmission holes 53 are formed in portions of the main body member 51, corresponding to the respective lens mounting portions 52a and 52b. Also, supporting units 54 are provided on both front/rear ends of the main body member 51, and an inner side surface of this supporting unit 54 is rotatably supported by outer side surfaces of one pair of supporting arms 26 within a range of 180 degrees. Precisely speaking, the converter unit 50 is so constructed by that under such a condition that a rotation center "S" of this converter unit 50 is positioned on an optical axis "$O_M$" of the master lens 23 and a central line of a lens mounting portion 52b provided on a light-projection-side of the converter unit 50 is made coincident with the optical axis $O_M$ of the master lens 23, a central line of another lens mounting portion 52a provided on a light-incident-side of this converter unit 50 is intersected with the optical axis $O_M$ of the master lens 23 at a right angle at the rotation center S. As a consequence, since this converter unit 50 is rotated by 180 degrees, one lens mounting portion 52b is moved to both positions, i.e., a position where this lens mounting portion 52b is located close to the master lens 23, and another position where this lens mounting portion 52b is most separated apart from the master lens 23. The other lens mounting portion 52a is moved to both positions, namely, a position where this lens mounting portion 52a is positioned close to the photographing opening unit 18 of the camera case 17, and another position where this lens mounting portion 52a is most separated apart from the photographing opening unit 18.

Then, the converter lens 28 and a reflection mirror 55 are mounted on this converter unit 50. The converter lens 28 is a wide angle lens system constructed of two lenses, i.e., the light-incident-sided lens 28a and the light-projection-sided lens 28b similar to the first embodiment. The light-incident-sided lens 28a is mounted on a light-incident-sided lens mounting portion 50a of the converter unit 50, and the light-projection-sided lens 28b is mounted on the light-projection-sided lens mounting portion 50b of this converter unit 50. As a consequence, the respective lenses 28a and 28b are arranged under such a condition that these lenses are intersected with each other at a right angle, the respective lenses 28a and 28b are rotatably moved from a position on an optical path to another position outside this optical path defined from the photographing object to the master lens 23, and also are switched. The reflection mirror 29 is an one-sided reflection mirror having a reflection surface 55a provided only on one surface thereof. This reflection mirror 55 is fixed between one pair of supporting arms 26 corresponding to the rotation center S of the converter unit 50 in such a way that this reflection mirror 55 is inclined by 45 degrees with respect to the optical axis $O_M$ of the master lens 23.

It should be noted that the converter unit 50 is rotated in conjunction with the pivot manipulation of the switching lever 21 provided on the side surface of the camera case 17.

WIDE ANGLE IMAGING OPERATION OF SECOND ELECTRONIC DIGITAL STILL CAMERA APPARATUS

A description will now be made of various operations of the above-described second electronic digital still camera apparatus 1 shown in FIG. 12 to FIG. 13.

In the case that the photographing object is photographed by the wide angle lens system of the second electronic digital still camera apparatus 1, as shown in FIG. 12, the switching lever 21 is pivotally operated to position a positioning mark 21a to the wide angle position (position "WIDE") in a similar manner to the first embodiment. Thus, the converter unit 50 is rotated, so that the light-projection-sided lens 28b of the converter lens 28 employed in the wide angle lens system is arranged close to the master lens 23, and the light-incident-sided lens 28a is arranged close to the photographing opening unit 18 of the camera case 17. At this time, even when the converter unit 50 is rotated, the reflection mirror 55 is not rotated, but the reflection plane 55a of the reflection mirror 50 is always inclined by 45 degrees with respect to the optical axis $O_M$ of the master lens 23. As a result, when the light-incident-sided lens 28a is directed to the photographing object, the wide angle photographing operation by the first electronic digital still camera apparatus 1 can be prepared.

Under this wide angle photographing operation, similar to the first embodiment, the light derived from the photographing object is entered from the photographing opening unit 18 into the light-incident-sided lens 28a of the converter lens 28, and then is reflected from the reflection plane 55a of the reflection mirror 55. This reflection light is entered via the light-projection-sided lens 28b into the master lens 23, so that this incident light is focused onto the imaging surface of the solid-state imaging element 21 as the wide angle image of the photographing object. At this focusing operation, the image of the photographing object is focused by the reflection mirror 55 as the image reversed with respect to the right/left direction. This focused image is converted into the electric image signal by the solid-state imaging element 21, and then this electric image signal is temporarily stored in the DRAM 39 as the digital image signal in a similar manner to the first embodiment. Since the stored digital image signal is read in accordance with the sequential operation different from that for the writing operation under control of the CPU 44, the wide angle image of the photographing object is displayed on the liquid crystal display panel 5 as the image correctly directed along the right/left direction. As a consequence, while observing the image of the photographing object displayed on the liquid crystal display panel 5, this photographing object can be photographed by the first electronic digital still camera apparatus in the wide angle mode.

TELESCOPIC IMAGING OPERATION OF SECOND ELECTRONIC DIGITAL STILL CAMERA APPARATUS

In the case that the photographing object is photographed by the telescopic lens system of the second electronic digital still camera apparatus 1, as shown in FIG. 13, the switching lever 21 is pivotally operated to position the positioning mark 21a to the telescopic imaging position (position "TELE") in a similar manner to the first embodiment. Thus, the converter unit 50 is rotated by 180 degrees, the respective lenses 28a and 28b of the converter lens 28 are rotatably moved out from the optical path defined from the photographing object to the master lens 23. At this time, even when the converter unit 50 is rotated, the reflection mirror 55 is not rotated, but the reflection plane 55a is always inclined by 45 degrees with respect to the optical axis $O_M$ of the master lens 23, so that this reflection plane 55a is located opposite to the photographing opening unit 18 of the camera case 17 and the master lens 23. As a result, when the reflection plane 55a of the reflection mirror 55 is directed to the photographing object, the telescopic photographing operation by the second electronic digital still camera apparatus 1 can be prepared.

Under this telescopic photographing operation, the light derived from the photographing object is entered through the photographing opening unit 18, and then is reflected from the reflection plane 55b of the reflection mirror 55. This reflection light is entered into the master lens 23 corresponding to the telescopic lens system, so that this incident light is focused onto the imaging surface of the solid-state imaging element 21 as the telescopic image of the photographing object. Also, at this focusing operation, the image of the photographing object is focused by the reflection mirror 55 as the image reversed with respect to the right/left direction. Similar to the wide angle photographing operation, this focused image is converted into the electric image signal by the solid-state imaging element 21, and then this electric image signal is temporarily stored in the DRAM 39 as the digital image signal. Since the stored digital image signal is read in accordance with the sequential operation different from that for the writing operation under control of the CPU 44, the telescopic image of the photographing object is displayed on the liquid crystal display panel 5 as the image correctly directed along the right/left direction. As a consequence, while observing the image of the photographing object displayed on the liquid crystal display panel 5, this photographing object can be photographed by the second electronic digital still camera apparatus in the telescopic imaging mode.

As described above, in this second electronic digital still camera apparatus 1, similar to the first embodiment, the optical path defined from the photographing object to the imaging plane is bent by employing the reflection mirror 55. As a result, the entire length of the camera unit 3 can be set by the short optical path length defined from the imaging surface to the reflection mirror 55 without changing the optical path length defined from the imaging surface to the light-incident-sided lens 28a of the converter lens 28. The entire dimension of the camera unit 3 is not restricted by the optical path length defined from the imaging surface to the converter lens 8, but also the entire camera unit 3 can be made compact. Moreover, the camera unit 3 can be mounted in high density. Also, in accordance with the second electronic digital still camera apparatus 1, the image of the photographing object is focused by the reflection mirror 55 as the image reversed with respect to the right/left direction. This focused image is converted into the electric image signal by the solid-state imaging element 21, and then this electric image signal is temporarily stored in the DRAM 39 as the digital image signal. Since the stored digital image signal is read in accordance with the sequential operation different from that for the writing operation under control of the CPU 44, this read digital image signal can be handled as the image signal about the same image of the photographing object correctly directed along the right/left direction. As a consequence, while observing the image of the photographing object displayed on the liquid crystal display panel 5, this photographing object can be photographed by the second electronic digital still camera apparatus under better conditions.

It should also be noted that although the converter lens 28 is the wide angle lens system constructed of two sets of lenses in the above-described first and second embodiments, the present invention is not limited thereto, but may be applied to, for instance, a wide angle lens constituted by a single lens. Also, the wide angle lens system has been employed as this converter lens 28, but the present invention is not limited thereto. For example, a telescopic lens system may be employed as this converter lens 28.

As easily understood from the foregoing descriptions, the present invention is not limited to the above-explained electronic digital still camera apparatuses 1, but may be applied to photographic camera apparatuses which are commercially available. That is, when the above-described structural features of the present invention, namely, the optical combination of the converter lens 28 and the reflection mirror 29 or 55 is introduced into the normal photographic camera apparatuses, the above-explained various advantages of the present invention may be satisfactorily achieved. Since the construction of such a normal photographic camera apparatus is well known in this field, no further detailed descriptions are made in this specification.

What is claimed is:

1. An electronic camera apparatus capable of switching photographing ranges, comprising:
    a master lens for focusing an image of a photographing object onto an imaging plane thereof;
    a converter unit which includes a converter lens rotatably moved between a position on an optical path defined from said photographing object to said master lens, and another position outside said optical path defined from said photographing object to said master lens; and
    a reflection section arranged at a position substantially equal to a rotation center of said converter unit, said reflection section being arranged to reflect light derived from said photographing object toward said master lens; and
    wherein said converter lens comprises two sets of a light-incident-sided lens and a light-projection-sided lens, and wherein both said light-incident-sided lens and said light-projection-sided lens are positioned such that optical axes thereof intersect each other at a right angle.

2. An electronic camera apparatus as claimed in claim 1, wherein:
    said master lens corresponds to a telescopic imaging lens system, and said converter unit corresponds to a wide angle lens system.

3. An electronic camera apparatus as claimed in claim 1, wherein:
    said reflection section is positioned at an intersection point of said optical axes.

4. An electronic camera apparatus as claimed in claim 1, wherein:
    said reflection section comprises a reflection mirror having reflection planes on both side planes thereof.

5. An electronic camera apparatus as claimed in claim 1, wherein:
    said reflection section comprises two sets of one-sided reflection mirrors each having a single reflection plane.

6. An electronic camera apparatus as claimed in claim 1, further comprising:
    a solid-state imaging section positioned at the imaging plane of said master lens, for imaging an image of said photographing object, which image has been reflected by said reflection section to be reversed with respect to right/left directions, to produce image data; and
    an image inverting section arranged to invert said image data with respect to the right/left directions to produce an originally positioned image of said photographing object with respect to the right/left directions.

7. An electronic camera apparatus capable of switching photographing ranges, comprising:
    a master lens for focusing an image of a photographing object onto an imaging plane thereof; and
    a converter unit which includes a mirror and a converter lens, and wherein the converter unit is rotatably movable; and
    wherein said mirror is arranged at a position substantially equal to a rotation center of said converter unit, and reflects light derived from said photographing object toward said master lens.

8. An electronic camera apparatus as claimed in claim 7, wherein:
    said converter lens comprises two sets of a light-incident-sided lens and a light-projection-sided lens, and wherein both said light-incident-sided lens and said light-projection-sided lens are positioned such that optical axes thereof intersect each other at a right angle.

9. An electronic camera apparatus capable of switching photographing ranges, comprising:
    a master lens for focusing an image of a photographing object onto an imaging plane thereof;
    a converter lens rotatably moved between a position on an optical path-defined from said photographing object to said master lens, and another position outside said optical path defined from said photographing object to said master lens; and
    a reflection mirror arranged at a position substantially equal to a rotation center of said converter lens, for reflecting light derived from said photographing object toward said master lens; and
    wherein said converter lens comprises two sets of a light-incident-sided lens and a light-projection-sided lens, and wherein both said light-incident-sided lens and said light-projection-sided lens are positioned such that optical axes thereof intersect with each other at a right angle.

10. An electronic camera apparatus as claimed in claim 9, wherein:
    said master lens corresponds to a telescopic imaging lens system, and said converter lens corresponds to a wide angle lens system.

11. An electronic camera apparatus as claimed in claim 9, wherein:
    said reflection mirror is positioned at an intersection point of said optical axes.

12. An electronic camera apparatus as claimed in claim 9, further comprising:
    a CCD (charge-coupled device) for imaging an image of the photographing object focused on said imaging plane; and
    wherein said reflection mirror is fixed with respect to said CCD.

13. An electronic camera apparatus as claimed in claim 9, wherein:
    said light-incident-sided lens and said light-projection-sided lens of the converter lens are moved at the same time.

14. An electronic camera apparatus as claimed in claim 9, wherein:

said light-incident-sided lens and said light-projection-sided lens of the converter lens are not relatively moved.

15. An electronic camera apparatus as claimed in claim 9, further comprising:
   a CCD (charge-coupled device) positioned at the imaging plane of said master lens, for imaging an image of said photographing object which has been reflected by said reflection mirror to be reversed with respect to right/left directions, to produce image data; and
   an image inverter which is arranged to invert said image data with respect to the right/left directions to produce an originally positioned image of said photographing object with respect to the right/left directions.

16. An electronic camera apparatus capable of switching photographing ranges, comprising:
   a master lens for focusing an image of a photographing object onto an imaging plane thereof;
   a reflection section positioned on an optical path defined from said photographing object to said master lens, for reflecting light derived from said photographing object toward said master lens;
   a CCD (charge-coupled device) positioned at the imaging plane of said master lens, for imaging an image of said photographing object which has been reflected by said reflection section to be reversed with respect to right/left directions, to produce image data;
   an image inverter which is arranged to invert said image data with respect to the right/left directions to produce an originally positioned image of said photographing object with respect to the right/left directions; and
   converter lenses provided on a light-incident-side and a light-projection-side of said reflection section.

17. An electronic camera apparatus as claimed in claim 16, wherein:
   said reflection section has two reflection planes.

18. A photographic camera apparatus capable of mechanically switching photographing ranges, comprising:
   a master lens for focusing an image of a photographing object onto an imaging plane thereof;
   a converter lens mechanically rotated so as to be moved between a position on an optical path defined from said photographing object to said master lens, and another position outside said optical path defined from said photographing object to said master lens; and
   a reflection mirror arranged at a position substantially equal to a rotation center of said converter lens, for reflecting light derived from said photographing object toward said master lens; and
   wherein said converter lens comprises two sets of a light-incident-sided lens and a light-projection-sided lens, and wherein both said light-incident-sided lens and said light-projection-sided lens are positioned such that optical axes thereof intersect each other at a right angle.

19. A photographic camera apparatus as claimed in claim 18, wherein:
   said master lens corresponds to a telescopic imaging lens system, and said converter lens corresponds to a wide angle lens system.

20. A photographic camera apparatus as claimed in claim 18, wherein:
   said reflection mirror is positioned at an intersection point of said optical axes.

21. A photographic camera apparatus as claimed in claim 18, wherein:
   said reflection mirror has reflection planes on both side planes thereof.

22. A photographic camera apparatus as claimed in claim 18, wherein:
   said reflection mirror comprises two sets of one-sided reflection mirrors each having a single reflection plane.

23. An electronic camera apparatus capable of switching photographing ranges, comprising:
   a master lens for focusing an image of a photographing object onto an imaging plane thereof;
   a converter unit which includes a converter lens rotatably moved between a position on an optical path defined from said photographing object to said master lens, and another position outside said optical path defined from said photographing object to said master lens; and
   a reflection section arranged at a position substantially equal to a rotation center of said converter unit, said reflection section being arranged to reflect light derived from said photographing object toward said master lens; and
   said reflection section comprises a reflection mirror having reflection planes on both side planes thereof.

24. An electronic camera apparatus capable of switching photographing ranges, comprising:
   a master lens for focusing an image of a photographing object onto an imaging plane thereof;
   a converter unit which includes a converter lens rotatably moved between a position on an optical path defined from said photographing object to said master lens, and another position outside said optical path defined from said photographing object to said master lens; and
   a reflection section arranged at a position substantially equal to a rotation center of said converter unit, said reflection section being arranged to reflect light derived from said photographing object toward said master lens; and
   said reflection section comprises two sets of one-sided reflection mirrors each having a single reflection plane.

25. An electronic camera apparatus capable of switching photographing ranges, comprising:
   a master lens for focusing an image of a photographing object onto an imaging plane thereof;
   a converter unit which includes a converter lens rotatably moved between a position on an optical path defined from said photographing object to said master lens, and another position outside said optical path defined from said photographing object to said master lens;
   a reflection section arranged at a position substantially equal to a rotation center of said converter unit, said reflection section being arranged to reflect light derived from said photographing object toward said master lens;
   a solid-state imaging section positioned at the imaging plane of said master lens, for imaging an image of said photographing object, which image has been reflected by said reflection section to be reversed with respect to right/left directions, to produce image data; and
   an image inverting section arranged to invert said image data with respect to the right/left directions to produce an originally positioned image of said photographing object with respect to the right/left directions.

26. An electronic camera apparatus capable of switching photographing ranges, comprising:
   a master lens for focusing an image of a photographing object onto an imaging plane thereof;

a converter lens rotatably moved between a position on an optical path-defined from said photographing object to said master lens, and another position outside said optical path defined from said photographing object to said master lens;

a reflection mirror arranged at a position substantially equal to a rotation center of said converter lens, for reflecting light derived from said photographing object toward said master lens;

a CCD (charge-coupled device) positioned at the imaging plane of said master lens, for imaging an image of said photographing object which has been reflected by said reflection mirror to be reversed with respect to right/left directions, to produce image data; and an image inverter which is arranged to invert said image data with respect to the right/left directions to produce an originally positioned image of said photographing object with respect to the right/left directions.

27. A photographic camera apparatus capable of mechanically switching photographing ranges, comprising:

a master lens for focusing an image of a photographing object onto an imaging plane thereof;

a converter lens mechanically rotated so as to be moved between a position on an optical path defined from said photographing object to said master lens, and another position outside said optical path defined from said photographing object to said master lens; and a reflection mirror arranged at a position substantially equal to a rotation center of said converter lens, for reflecting light derived from said photographing object toward said master lens; and wherein said reflection mirror has reflection planes on both side planes thereof.

28. A photographic camera apparatus capable of mechanically switching photographing ranges, comprising:

a master lens for focusing an image of a photographing object onto an imaging plane thereof;

a converter lens mechanically rotated so as to be moved between a position on an optical path defined from said photographing object to said master lens, and another position outside said optical path defined from said photographing object to said master lens; and a reflection mirror arranged at a position substantially equal to a rotation center of said converter lens, for reflecting light derived from said photographing object toward said master lens; and wherein said reflection mirror comprises two sets of one-sided reflection mirrors each having a single reflection plane.

* * * * *